July 20, 1943.

G. W. TEMPLE 2,324,890

COLLAPSIBLE TUBE SPRAYING MACHINE

Filed Aug. 7, 1941

INVENTOR
*George W. Temple*
BY
*Harry Jacobson*
ATTORNEY

July 20, 1943.    G. W. TEMPLE    2,324,890
COLLAPSIBLE TUBE SPRAYING MACHINE
Filed Aug. 7, 1941    4 Sheets-Sheet 3
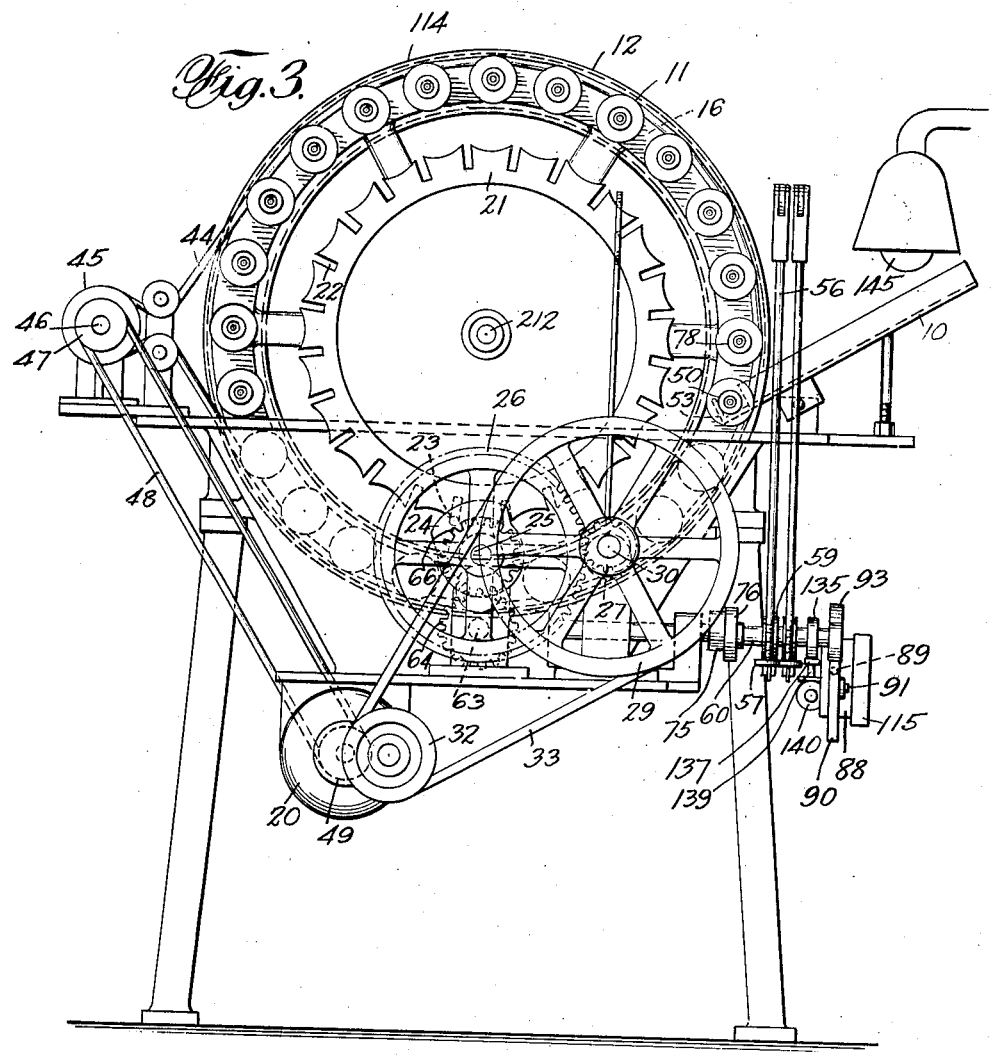
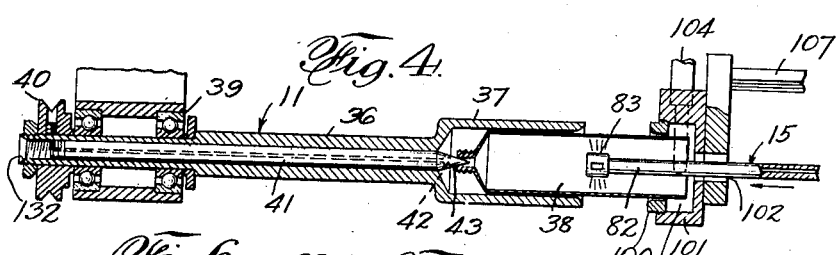
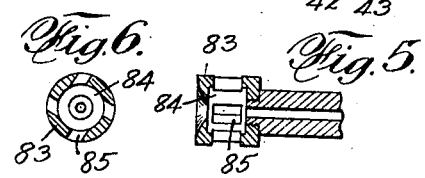
INVENTOR
George W. Temple
BY
ATTORNEY July 20, 1943.  G. W. TEMPLE  2,324,890
COLLAPSIBLE TUBE SPRAYING MACHINE
Filed Aug. 7, 1941  4 Sheets-Sheet 4

INVENTOR
George W. Temple
BY
ATTORNEY

Patented July 20, 1943

2,324,890

UNITED STATES PATENT OFFICE 2,324,890

COLLAPSIBLE TUBE SPRAYING MACHINE

George W. Temple, Flushing, N. Y., assignor to Victor Metal Products Corporation, Brooklyn, N. Y., a corporation of New York Application August 7, 1941, Serial No. 405,734

20 Claims. (Cl. 91—45)

This invention relates to spraying machines and particularly to those designed automatically to handle and spray extremely thin and hence easily damaged collapsible tubes.

Such tubes are usually made of tin, lead, aluminum and other metals which are sometimes chemically attacked by the tube contents. In such cases it has been customary to spray the interior of the tube with a suitable coating and thereby to prevent the undesirable chemical action. The hand spraying methods and manually operated apparatus for accomplishing the spraying heretofore have proved to be uneconomical and unsatisfactory.

This invention therefore contemplates the provision of a machine for automatically accomplishing the mounting, discharge and spraying of the interior of collapsible tubes rapidly and efficiently and without the necessity for any manual handling of the tube or manual operation of the apparatus.

The invention further contemplates the provision of a machine for automatically mounting the tubes in succession on the holders of an intermittently movable turret, for moving a sprayer into the interior and out of a mounted tube, and for spraying the tube during the withdrawal of the sprayer while the tube is rotated to produce the even coating of the tube, and for heating the coated tube and automatically ejecting it from the holder after the coating has dried.

The invention further contemplates the provision of a machine wherein the tubes, the spraying liquid, and the air used for accomplishing the spraying are all pre-heated before the spraying operation, and the coated tubes heated after the spraying operation for a sufficient time to thoroughly dry the coating, whereafter the tube is automatically dismounted and discharged from the machine, provision being made to halt the machine should the machine fail to discharge the coated tube.

The invention further contemplates the provision of means for adequately holding and rotating the tube during the spraying thereof while permitting the tube to be easily dismounted when desired.

The various objects of the invention will be clear from the description which follows and from the drawings, in which, Fig. 1 is a top plan view of the machine.

Fig. 2 is a front elevation of the same.

Fig. 3 is a side elevation of the same, as viewed from the left of Fig. 2.

Fig. 4 is a vertical longitudinal section of the tube-holding and rotating means.

Fig. 5 is an enlarged vertical section of the discharge end of the sprayer.

Fig. 6 is a cross-section of the same.

Figure 1:
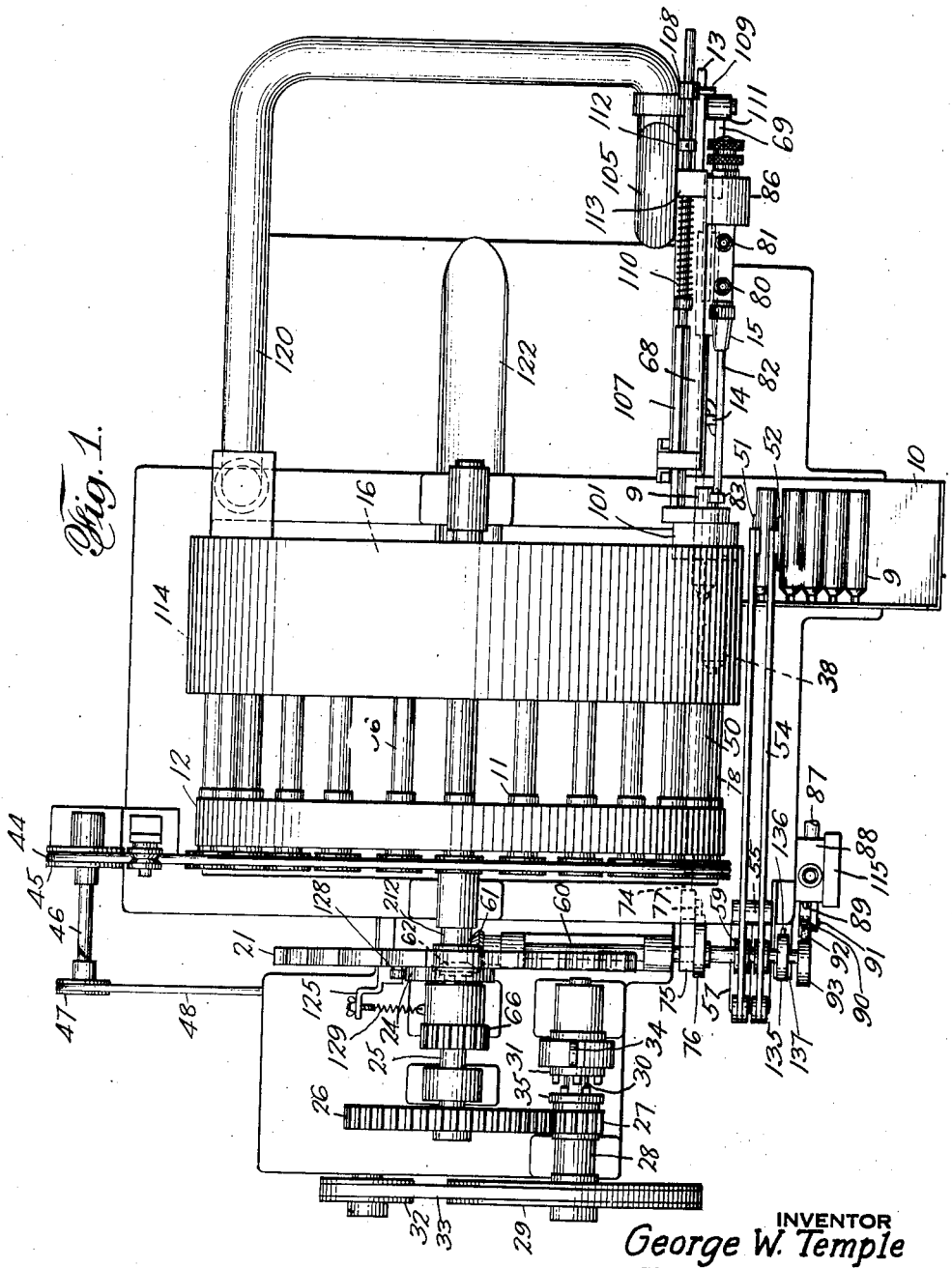

In the practical embodiment of the invention shown by way of example, the tubes 9 (Fig. 1) to be coated are fed to the inclined chute 10 down which they roll against a suitable stop into position for the mounting thereof in one of the plurality of tube holders 11. Each of said holders is hollow to receive and fit the tube snugly and is rotatably mounted in the turret 12. Reciprocating means, including the mounting slide 13 (Fig. 2) provided with the mounting member 14 to engage the open end of the tube, are employed to insert the tube into the holder 11 at the mounting station while the turret 12 is at rest. Simultaneously, the sprayer 15 is inserted into another tube to a point close to the neck end thereof through the open end of the tube previously mounted on a holder. On the withdrawal of the slide 13, a suitable atomized liquid is forced under pressure through the sprayer, while the holder and the tube carried thereby are rotated. After leaving the spraying station, the tube and its holder pass through a heating chamber 16 for the desired time necessary to evaporate the solvent carrying the coating material, the coating being completely dry by the time the tube reaches its dismounting station. At the dismounting station, a suitable nozzle 17 engages the end of the holder and fluid under pressure such as compressed air is forced through the holder and against the shoulder at the neck end of the tube to dismount the tube from the holder. Should the apparatus fail to dismount the tube as it should, the lever 18 (Fig. 7) is tripped by the retained tube, to cause the switch 19 to open, thereby cutting off the current to the operating motor 20. The machine is thereby halted and damage to the remaining tubes is prevented. The safety switch 19 is preferably connected to a suitable starter switch of any well-known type, not necessary to be shown nor described, by suitable means which causes the starter switch to open when the safety switch 19 is open. It then becomes necessary first to close the starter switch before the machine can be again started, since closing of the safety switch alone will not close the circuit to the motor nor start the machine.

The machine will now be described in detail.

The turret 12 is mounted on the turret shaft 212 carrying the Geneva wheel 21. Said wheel is provided with a series of radial slots 22, one for each of the holders 11. The Geneva pin 23 carried by the cam 24 on the shaft 25 enters each of the slots successively to rotate the turret intermittently one step at a time on each rotation of the shaft 25. To drive said shaft, the larger gear 26 thereon meshes with the smaller gear 27 on the sleeve 28. The pulley shaft 30 passing through the sleeve 28 carries the pulley 29 and also carries the clutch member 31 which is keyed to said shaft 30 for sliding movement relatively thereto and for rotation therewith. Connecting the pulley 29 to the reduction gear pulley 32 operated by the motor 20, is the belt 33. Consequently, on operation of the motor and the shifting of the clutch member 31 by means of the handle lever 34 to engage the clutch member 31 with the clutch member 35 on the sleeve 28, said sleeve is operatively connected to the pulley shaft 30 and through the gears 27 and 26 causes the cam 24 to rotate and to carry the Geneva pin into a slot 22 on the Geneva wheel, thereby to advance the turret and the holders 11 carried thereby each one step.

Figure 7:
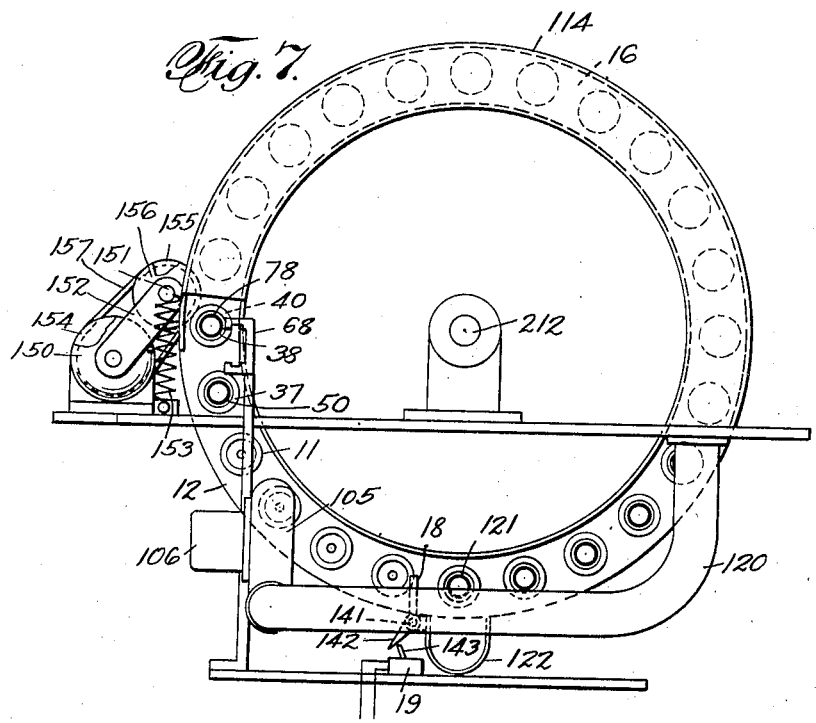
Fig. 7 is a fragmentary side view of the right hand end of the machine as viewed in Fig. 2, showing the safety switch designed to halt the machine on the failure of the machine to discharge the tube therefrom, and also showing a modified form of the tube-rotating means.

As best seen in Fig. 4, each of the holders 11 comprises a sleeve 36 having an enlarged end portion 37 adapted to frictionally receive and hold the tube 38 to be sprayed. Said sleeve is revolubly mounted in suitable bearings as 39 in the turret 12 and is provided with a pulley or disc 40 fixed thereto at the outer end thereof whereby the sleeve may be rotated relatively to the turret. Fixed within the sleeve is the pipe member 41 provided with discharge openings as 42 in the tapered end 43 thereof. Said tapered end closes the neck of the tube against the discharge of spraying material if the neck is open. If the neck is closed or capped, the tapered end of the member 41 merely engages the end of the closed neck or the cap to limit the position of the tube in the holder. Compressed air forced through the passage of the holder formed by the pipe and through the discharge openings 42 of the member 41 against the tube shoulder, blows the tube out of the holder after the tube has been coated and dried and is ready for discharge from the machine. It will be understood that the holder 11 is continuously rotated at least during the spraying operation for a sufficient time to spread the coating evenly thereon. For this purpose, the belt 44 (Fig. 3) engages a selected series of discs or pulleys 40 on a number of the holders, said belt being driven by the pulley 45 on the shaft 46 through the pulley 47 on said shaft. The pulley 47 is in turn driven by the belt 48 through the motor pulley 49. A modified form of the holder-rotating means is shown in Fig. 7 and will be later described. In such form, only the tube being sprayed is rotated.

The tubes are mounted on the holders 11 successively at the mounting station indicated by the numeral 50 (Fig. 3) when the holder reaches said station. The operator supplies tubes to the machine by arranging said tubes on the inclined chute 10 with the necks of the tubes arranged toward the left as viewed in Fig. 1. The tubes roll down said chute until they reach the gate 51 (Fig. 1), which at that time is down or in its lowermost position to halt the row of tubes. The second gate 52, however, is in its up position, but is lowered between the lowermost and the succeeding tubes of the row when the gate 51 is lifted. Lifting the gate 51 while the gate 52 is down permits the lowermost tube to roll further down the chute until halted by the stop 53 (Fig. 3) at the lowermost end of the chute in position for mounting in the holder. After the last tube has thus been released, the gate 51 is lowered and the gate 52 raised to permit the row to slide against said gate 51, whereafter the gate 52 is lowered and the operation repeated. One tube at a time is thereby fed to the mounting station.

The means for operating the gates is the same for each of the gates and is best seen in Fig. 2. Each gate is connected at its upper end with a lever 54 pivotally mounted as at 55 and operated by a vertically reciprocating rod 56. Each rod 56 is reciprocated by means of a lever 57 pivoted to the frame of the machine as at 58 (Fig. 2) and connected with the lower end of the rod. Each lever 57 is oscillated about its pivot by means of a cam 59 on the shaft 60. Said shaft terminates at its rear end in the bevel gear 61 meshing with the bevel gear 62 on the shaft 63. The shaft 63 carries the gear 64 (Fig. 3) meshing with the gear 66 on the shaft 25, whereby the shaft 60 is continuously rotated and the gates alternately raised and lowered in accordance with the operation of the respective levers 57 and rods 56 by their respective cams 59.

The means for mounting the tube resting against the stop 53 on to its holder at the mounting station 50 comprises the mounting member 14 carried by the slide 13, said slide being mounted for horizontal reciprocation in the fixed guide 68. Said mounting member 14 is provided with a flat surface to engage the end of the tube and to forward said tube toward the left as viewed in Fig. 2, thereby to insert the end portion of the tube into the enlarged portion 37 of the holder 11. A conoidal projection on the member 14 enters the interior of the tube and not only prevents the end from buckling under the pressure thereon, but also centers the tube accurately for the mounting operation. It will be understood that the innermost diameter of the holder part 37 is such that the inner surface of said holder snugly fits the exterior cylindrical surface of the tube and holds said tube frictionally, but removably, in place during the spraying and drying operations. The fit, however, is not too tight to permit the tube to be discharged from the holder by a blast of air.

To reciprocate the slide 13 and thereby to cause the member 14 to mount the tube in the holder, a crank 69 is pivoted to the slide at one end 70 while the other end thereof is pivoted to the lever 71 which is in turn pivoted to the frame of the machine as at 72 and carries the adjustable weight 73. The lever is oscillated at the proper time to reciprocate the slide 13 by means of the rod 74 pivoted at one end to the lever 71 and at its other enlarged end 75, being provided with a slot through which the shaft 60 passes. The cam 76 on the shaft 60 (Fig. 1) engages the roller 77 on the end 75 of said rod 74 and moves said rod toward the right, as viewed in Figs. 1 and 2, thereby oscillating the lever 71 in a clockwise direction and moving the slide 13 toward the right to position the member 14 ready for the mounting operation. When the roller 77 is released by the cam 76, the weight 73 operates to rotate the lever 71 in a counterclockwise direction and to move the slide 13 toward the left, thereby to cause the mounting member 14 to engage the open end of the tube resting against the stop 53 and to move said tube toward the left and into the holder member 37.

Simultaneously with the mounting of a tube on one holder at the mounting station 50, the sprayer 15, also carried by the slide 13, is moved toward the left with the slide and inserted into the tube previously mounted on the succeeding holder, the spraying operation being performed at the station indicated by the numeral 78 (Fig. 3). The sprayer may be of any well-known type operated by fluid under pressure such as compressed air and having suitable air and liquid inlets and valves to atomize the liquid fed thereto. Preferably, the sprayer is such as is manufactured by the De Villbiss Co. and known as a "De Villbiss" sprayer. Said sprayer is provided with an inlet pipe 79 for heated air, an inlet pipe 80 for the pre-heated coating liquid, which is preferably wax carried by a suitable vehicle or dissolved in a suitable solvent, and a control air inlet 81 for operating the piston and needle valve 86 governing the admission of material into the sprayer at the atomizing thereof. Said inlets 79, 80 and 81 lead to the pipe 82 which terminates in the spraying nozzle 83. Said spraying nozzle is provided with an enlarged chamber 84 for receiving the combined air and coating liquid and directing said liquid against the inner tube surface through the inclined or non-radial discharge ports 85 arranged at the proper angle to give a whirling action to the spray and thereby adequately to coat the tube during the rotation of the holder 11 and as the nozzle is withdrawn toward the right, as viewed in Fig. 4, from the neck end of the tube toward the open end thereof. It will be understood that the compressed air to operate the valves of the sprayer is fed into the sprayer at the proper times and that the atomized mixture of coating liquid and hot air controlled by the sprayer valve is fed into the nozzle 83 at the proper time to perform the coating operation.

Suitable means are provided for controlling the air to the nozzle 83. As best seen in Figs. 1 and 2, the hot air inlet pipe 79 leads to the hot air inlet pipe 87, a suitable valve being interposed therebetween. Said valve also controls the admission of compressed air into the pipe 81 and is carried by the casing 88 and terminates in a stem 89 (Figs. 1 and 3) which is moved to open the valve at the proper time by a suitable valve-operating member carried by the valve-operating lever 90. Said lever is pivoted to the casing 88 as at 91 and carries the roller 92 engaging the cam 93 on the shaft 60, the spring 94 serving to maintain the roller against the cam. On the rotation of the shaft 60, the lever 90 is swung by the cam 93 in a clockwise direction, as viewed in Fig. 2, to cause said lever to engage the valve stem 89 and to open the hot air and compressed air valve, thereby permitting hot air to enter the pipe 79 ready to atomize the coating liquid. At about the same time, the piston valve 86 of the sprayer is opened under the influence of air conducted through the pipe 81, thereby permitting the hot air to atomize the liquid and to draw the atomized material into the nozzle pipe 82, and to force the coating material through the nozzle 83. As has been hereinbefore indicated, as the mounting member operates to mount a tube at the station 50, the spraying nozzle 83 is inserted into another tube at the station 78 close to the neck end of the tube, whereafter the valve stem 89 is operated and on the reciprocation of the slide 13 toward the right, material is fed through the nozzle 83 to coat the interior of the tube during the rotation thereof.

Means are provided to prevent excess coating material from undesirably reaching any part of the machine during the spraying operation. As best seen in Fig. 4, said means comprises the ring-holder 100 removably carried by the hood or support 101 which is provided with an opening 102 for the reciprocation of the sprayer pipe therethrough. The support 101 is provided with an exhaust chamber 103 in which the open end of the tube 38 is arranged during the spraying operation. Said exhaust chamber is connected to the exhaust pipe 104 leading to the suction fan 105 operated by a suitable motor 106 (Fig. 7). From the fan, the pipe leads to the tank or supply member of coating liquid so that the liquid withdrawn from the exhaust chamber 103 is conducted back to the tank for the reuse thereof. The support 101 is carried by the horizontal reciprocating slide member 107 provided with a collar 108 (Fig. 2) carrying the pin 109. Said pin is pulled by the spring 110 (Fig. 1) toward the left as viewed in Figs. 1 and 2 into contact with the roller 111 at the end of the crank 69. When said roller, however, moves toward the left during operation of the slide 13, the spring 110 becomes effective to carry the collar 112 on the slide member 107 against the fixed stop 113 and thereby to arrange the support member 101 in the operative position thereof shown in Fig. 4. On movement of the slide 13 toward the right to withdraw the nozzle 83 from the tube interior, the support 101 remains in place around the tube end until the nozzle reaches the open end of the tube, whereupon the valve stem 89 is operated to cut off the supply of hot air and compressed air and thereby to halt the spraying operation, whereafter the roller 111 engages the pin 109 to draw the slide member 107 toward the right and thereby to withdraw the member 100 toward the right away from the end of the tube ready for the next advance of the turret 12. It will therefore be seen that the stroke of the support 101 is limited to only a selected part of the stroke of the slide 13.

It will be understood that the cam 93 may be of the adjustable type to open and close the valves at different times whereby longer or shorter tubes may be properly sprayed and the nozzle 83 supplied with liquid during the longer or shorter portion of the stroke of the sprayer 15. Furthermore, the ring 100 may be replaced with one of larger or smaller interior diameter to correspond to tubes 38 of larger or smaller diameter and the holders 11 may also be replaced with those having holder portions 37 of larger or smaller diameter to correspond to the diameter of the tubes. The machine may therefore be readily adapted for operating upon tubes of different lengths and of different diameters.

It will be understood that during the spraying operation, the suction fan 105 is also in operation and withdraws excess material which may drip out of the tube 38 into the chamber 103 and also withdraws any liquid which may leak from the nozzle in the inoperative position thereof.

As the turret is intermittently advanced to carry the tube from the spraying station 78 through successive stations, the wet tube and the surrounding air is heated to hasten the drying of the coating material so that the tube will be completely dried in the time it takes the tube to move to the dismounting station. For this purpose, a hood 114 is arranged around the turret adjacent to the open ends of the coated tubes carried by the various holders. Hot air may be supplied to the hood by a suitable pipe leading from the hot air pipe 87, or any well-known electrically operated heating element may be arranged in the hood to heat the tubes. The air in the pipe 87 is heated by a suitable heating element 115 carried by the casing 88. Any fumes resulting from the quick evaporation of solvent are drawn out of the hood 114 by the suction fan 105 through the exhaust pipe 120.

Figure 8:
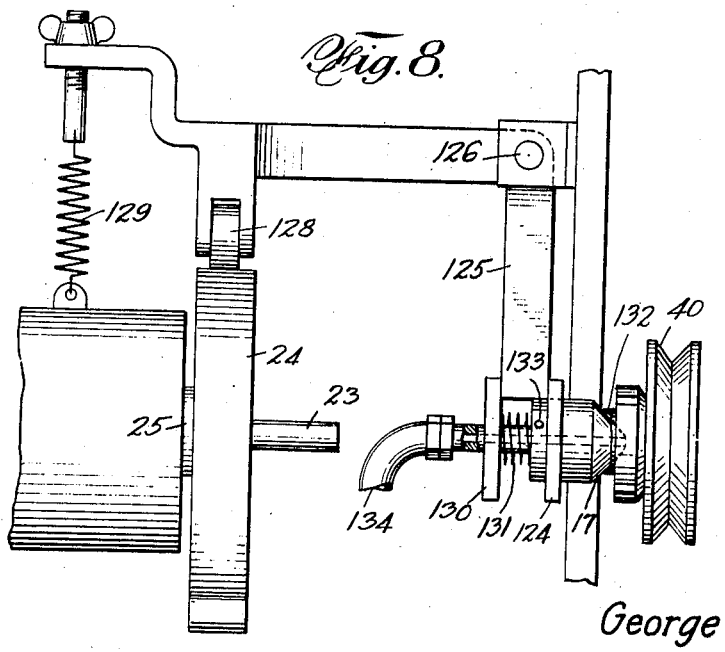
Fig. 8 is a fragmentary top plan view of the tube discharge means and its operating mechanism.

The dried tube is discharged at the dismounting station indicated by the numeral 121 (Fig. 7), the dismounted tube falling into the inclined discharge chute 122 and being conducted out of the machine. As best seen in Fig. 8, the means for discharging the tube comprises the nozzle 17 loosely mounted in the jaw 124 of the bell-crank-lever 125. Said lever is pivoted as at 126 to the frame of the machine and carries the cam roller 128 engaging the cam 24. The spring 129 connected to the bell-crank-lever and to a fixed part of the machine maintains the roller in contact with the cam. Interposed between the end of the nozzle 17 and a second jaw 130 fixed to the lever 125, is the spring 131 which urges the nozzle through the jaw 124 and into the bevelled end 132 of the holder sleeve 36. The discharge end of said nozzle is suitably tapered to form a substantial air-tight connection between the nozzle and said sleeve during the tube-dismounting operation. A suitable stop 133 on the nozzle engages the jaw 124 to prevent the nozzle from being moved by the spring completely through the jaw. It will be seen that the bell-crank-lever 125 is oscillated at the proper time by the cam 24 to carry the nozzle 17 into the sleeve ready for the dismounting of the tube at the dismounting station 121. A blast of compressed air through the nozzle acts upon the shoulders of the tube 38 and blows the tube out of the holder portion 37 on to the chute 122. Said blast is controlled by means of the cam 135 (Figs. 1 and 3) carrying the pin 136. Said pin engages the lever 137 pivoted to the frame of the machine as at 58 and normally resting on the stem 139 of the air inlet valve 140 (Fig. 2). On the rotation of the shaft 60, the pin 136 engages the lever 137 and depresses said lever to depress the valve stem 139 and to open the valve to the pipe 134, thereby to discharge compressed air through the nozzle and therethrough through the pipe 41 of the tube holder and against the tube shoulder to dismount the tube.

Safety means are provided, however, to halt the machine should the air blast fail to dismount the tube at the ejecting station 121. As has been hereinbefore mentioned, said means comprises the lever 18 pivoted to the frame of the machine as at 141 and having an arm 142 adjacent the switch arm 143 of the safety switch 19. The other arm of the lever 18 projects into the path of the open end of the tube. Should the tube not be discharged from its holder at the dismounting station, the end of the tube engages the lever 118 and trips said lever thereby operating the switch arm 143 to open the switch 19 to the motor 20. Current being thereby cut off from the motor, said motor ceases its rotation and further rotation of the turret 12 and further operation of the machine is halted until the switch 19 is again deliberately closed.

As best seen in Fig. 7, for the belt 44 may be substituted means for rotating the holder 11 only when it reaches the spraying station. Such rotation may be comparatively rapid to spread the coating material evenly on the inner surface of the tube. As shown, the motor 150 provided with a suitable pulley 154 drives the pulley 155 on the shaft 151 by means of the belt 157. Said shaft is yieldingly supported by the lever 152 pivoted to the motor shaft, the spring 153 serving to draw the holder-rotating disc 156 on the shaft 151 into contact with the holder pulley 40 or a disc substituted for said pulley. It will thus be seen that as the turret rotates in a clockwise direction, as viewed in Fig. 7, the holder pulley or disc engages the continuously rotating disc 156 and is rapidly rotated while the turret is at rest, thereby rotating the holder part 37. When the turret is again advanced, the holder pulley or disc pushes the pulley 155 and disc 156 out of its way in a counterclockwise direction against the action of the spring 153, said spring drawing the disc 156 in a clockwise direction into its operative position against the pulley or disc of the next holder after the preceding holder has passed the disc 156 and the turret is again at rest.

To assist the geneva pin 23 in maintaining the turret at rest during the mounting, spraying and dismounting operations and to stop the turret at its proper station, a suitable brake as 159 (Fig. 2) may be fixed to the machine frame and interposed in the path of the holders 11. Said brake as shown comprises a curved member of sheet metal having a free end portion yieldable when engaged by the tube holder and resisting movement of the holder therepast.

It will be understood that the mounting of a tube on the station 50, the spraying of another tube at the station 78, and the dismounting of a third tube at the station 121 occur simultaneously and while the turret is at rest. It will also be understood that the turret is of sufficient diameter to carry a comparatively large number of tube holders so that sufficient time elapses from the time the tube is mounted and sprayed to the time it is dismounted to thoroughly dry the tube coating. It will further be understood that the tubes on the chute 10 may be pre-heated to some extent prior to the mounting thereof on the station 50 by means of a suitable lamp 145 or other heating element. The coating liquid is also preferably heated so that by the use of heated tubes, hot air and heated coating liquid as well as the heating of the hood 114, the drying time may be controlled and hastened.

It will therefore be seen that I have provided a machine for automatically mounting, coating and discharging thin and comparatively fragile collapsible tubes in an efficient manner and that the machine is well adapted to fulfil the purpose for which it is intended.

While I have shown and described certain specific embodiments of the invention, I do not wish to be understood as limiting myself thereto, but intend to claim the invention as broadly as may be permitted by the state of the prior art and the scope of the appended claims.

I claim:

1. In a machine for coating the interior surface of collapsible tubes, a hollow tube holder, means for intermittently moving the holder to a mounting station, a spraying station and an ejecting station, reciprocating means at the mounting station to mount a tube in the holder, means for rotating the holder, means for spraying the tube interior at the spraying station while the holder is rotating, means between the mounting and ejecting stations to heat the coated tube, and means at the ejecting station to engage the holder and to direct fluid under pressure against the end of a tube in the holder to eject the tube.

2. In a machine for coating the interior surface of collapsible tubes, a revoluble tube holder, means for moving the holder from station to station, means at one station for mounting a tube having an open end in the holder, reciprocatory means at another station movable within the mounted tube on the holder for spraying and coating the interior of the tube, relatively fixed means for heating the coated tube, and means at another station for ejecting the heated tube.

3. In a machine for coating the interior surface of collapsible tubes, a revoluble tube holder, means for mounting a tube having an open end in the holder, reciprocatory means movable within the tube for spraying and coating the interior of the mouned tube during the rotation of the holder, relatively fixed, means for heating the coated tube, means coacting with the holders for ejecting the tube from the holder, and means movable to a position adjacent the open end of the tube for applying suction to the interior of the tube while said tube is in the holder and is being coated by the spraying means.

4. In a machine for coating the interior surface of collapsible tubes, a revoluble tube holder, means for mounting a tube having an open end in the holder, reciprocatory means movable within the tube for spraying and coating the interior of the mounted tube, relatively fixed means for heating the coated tube, means coacting with the holder for ejecting the tube from the holder, and means responsive to the movement of a tube maintained in the holder on the failure of the ejecting means to eject said tube for halting the machine.

5. In a machine for coating the interior surface of collapsible tubes, a plurality of revoluble, hollow tube holders, means for successively mounting tubes in frictional contact with the inner walls of said holders, means for rotating the holders about the respective axes thereof, reciprocating means movable within the successive mounted tubes for coating the tubes successively during the rotation of the holders, means movable around the inner open ends of the successive mounted tubes for exhausting excess coating material from the tubes during the operation of the coating means, means for intermittently advancing the holders for a sufficient period to dry the coated tubes, and means for ejecting the dried tubes from the machine.

6. In a machine for coating the interior surface of collapsible tubes, a hollow tube holder, means for rotating the holder, means for intermittently advancing the holder, means for mounting a tube in the holder, a spraying nozzle, means for reciprocating the nozzle into and out of the tube mounted in the holder, means for forcing coating material through the nozzle on the withdrawing movement of the nozzle out of the tube, reciprocating means movable into and out of a position substantially concentric with the inner open end portion of the mounted tube and operative on the withdrawing movement of the nozzle to exhaust excess coating material from the tube and the nozzle, and means for forcing compressed air against the other end of the tube to eject the tube from the holder.

7. In a machine for coating the interior surface of collapsible tubes, means for mounting a tube in the machine at one station, means responsive to fluid under pressure for simultaneously coating the interior of a mounted tube at another station, means for reciprocating the coating means into and out of the mounted tube, air blast means for simultaneously ejecting a coated tube from the machine at a third station and means for reciprocating the air blast means into and out of the tube-ejecting position thereof.

8. In a machine for coating the interior surface of collapsible tubes, a turret, means for intermittently rotating the turret, a plurality of revoluble hollow tube holders mounted in the turret, a pipe in each of the holders, and means for passing fluid under pressure through the pipe of a selected holder to eject a tube carried by the holder said means comprising a nozzle having a tapered inner end, and means for moving the nozzle parallel to the axes of the turret and the holder into air-tight contact with the outer end of the pipe while the turret is at rest, and then outwardly away from the pipe prior to the next movement of the turret.

9. In a collapsible tube spraying machine, a tube holder comprising a sleeve terminating in an enlarged hollow end part adapted to receive a collapsible tube, means for intermittently advancing the holder including a turret carrying the holder, means for rotating the holder, and a pipe within the sleeve and having an imperforate end part thereof arranged in the enlarged part of the holder in position to engage the outer end part of a tube positioned within the holder.

10. In a collapsible tube spraying machine, a revoluble tube holder having a relatively short end part provided with a cylindrical recess adapted to have a tube mounted therein with part of the tube projecting therefrom, an air blast passage in the holder to direct compressed air against the other part of the tube held by the holder, and exhaust means including a ring concentric with the holder, an exhaust chamber carrying the ring, and means for moving the ring and the chamber into a position around the projecting part of the tube, to apply suction to said projecting part.

11. In a collapsible tube spraying machine, a pair of tube holders, means for mounting a tube in one holder including a slide, a mounting member arranged to engage the open end of the tube and carried by the slide, and means to reciprocate the slide, a spraying nozzle carried coaxially of the other holder by the slide into and out of a tube mounted on the other holder on the reciprocation of the slide, means for discharging coating material from the nozzle on the withdrawing movement of the nozzle, means for rotating the holders, means for intermittently moving the holders, a reciprocating spring-pulled suction member movable to a position adjacent the open end of the tube, and cooperating means on the slide and the member for reciprocating said member through a limited stroke shorter than the stroke of the slide.

12. In a collapsible tube spraying machine, a tube holder, a reciprocatory slide, a tube mounting member carried by the slide, tube spraying means carried by the slide, and a spring-pulled suction member to exhaust excess tube coating material from a tube in the holder, said suction member being mounted for reciprocation in a direction parallel to the reciprocatory movement of the slide and provided with a projection arranged in the path of the slide, said projection being engaged by the slide and moved thereby during a selected part of the movement of the slide sufficiently to position the suction member around the inner end of the tube in the holder.

13. In a collapsible tube spraying machine, a revoluble tube holder to hold a tube with the open end portion of the tube projecting from the holder, a sprayer, means for relatively reciprocating the sprayer and the holder to carry the sprayer into and out of the holder, means for supplying spraying material to the sprayer to coat the interior surface of a tube mounted in the holder during the relative withdrawing movement of the sprayer and during the rotation of the holder, means including an exhaust chamber for exhausting excess material from the tube and the sprayer, and means for moving the chamber around the projecting end part of the tube and away from the tube alternately.

14. In a collapsible tube spraying machine, a revoluble tube holder provided with an air passage therethrough, and means for delivering a blast of air through the holder to dismount a tube held thereby including a reciprocatory air-conducting nozzle having an end portion shaped to engage the end of the holder to form a substantially air-tight joint therebetween, a compressed air pipe leading to the nozzle, means for reciprocating the nozzle alternately into contact with and away from said end of the holder, and means for controlling the air delivered to the nozzle.

15. In a collapsible tube spraying machine, a revoluble tool holder provided with an air passage therethrough, means for mounting a tube in the holder, means for rotating the holder, means for spraying the inner surface of said tube during the rotation of the holder, and means for dismounting the tube from the holder including a reciprocating air-conducting nozzle having an end portion arranged to engage and form a substantially air-tight joint with the outer end of the passage.

16. In a collapsible tube spraying machine, a turret, a plurality of tube holders revolubly mounted in the turret and each having an air passage therethrough, means for intermittently advancing the holders successively to a tube mounting station, a spraying station and a tube dismounting station, reciprocatory means at the mounting station to mount a tube on the holder, reciprocatory means at the spraying station to enter and leave and to spray the inner surface of the mounted tube, means for simultaneously reciprocating the mounting means and the spraying means, said spraying means including a nozzle having non-radial discharge ports to produce a whirling spray, means to control the discharge of spray from the nozzle to limit the operation of the spraying means to the withdrawal movement thereof out of the tube, means for rotating the tube holder during the spraying operation, and tube dismounting means at the dismounting station, said means including an air-conducting nozzle and means to reciprocate said nozzle up against and away from the outermost end of said air passage.

17. A machine according to claim 16, an exhaust member provided with an exhaust chamber, means for reciprocating the member through a selected part of the stroke of the spraying and mounting means to position the exhaust member around an end of the mounted tube during the spraying operation, and means to exhaust material from the chamber.

18. In a collapsible tube spraying machine, a pair of parallel, hollow, revoluble tube holders in spaced relation to each other, each having an air passage therethrough and provided with a pulley adjacent one end thereof and a tube-receiving recess at the other end thereof, a first slide, a tube-mounting member carried by the slide coaxially of the holder to push upon the open end part of a tube and to mount the tube in the recess, means for rotating the pulley of the other holder during the spraying operation, spraying means on the slide reciprocating in coaxial alignment with said other holder to spray the tube held thereby, a second slide mounted for movement parallel to the movement of the first slide, and cooperating means on the slides to move the second slide during part only of the movement of the first slide, and an exhaust chamber on the second slide carried thereby around the open end of the tube in the second holder to exhaust excess spraying material therefrom.

19. In a collapsible tube spraying machine, a tube holder, a slide, means for reciprocating the slide in a direction parallel to the axis of the holder, spraying means carried by the slide substantially coaxially of the holder and into and out of the holder, an exhaust chamber, slidable means carrying said chamber coaxially of the holder and into operative relation to a tube in the holder, and cooperating elements on the slide and slidable means for reciprocating the slidable means through a limited stroke shorter than the stroke of the slide.

20. In a collapsible tube spraying machine, a tube holder having an air passage therethrough, one end of said passage being tapered and the other end communicating with an enlarged end recess in the holder suitable for the reception of the neck end part of a collapsible tube having a neck end and an open end, reciprocating means for engaging the open end of a tube and pushing the tube into the recess, means for advancing the tube holder with the mounted tube therein to a spraying station and to an ejecting station, means at the spraying station to spray the interior of the tube, and means at the ejecting station to eject the sprayed tube comprising a reciprocating member tapered to engage the tapered end of the passage in the holder and having a passage therein for conducting fluid under pressure to the passage in the holder.

GEORGE W. TEMPLE.